(12) United States Patent
Guichard et al.

(10) Patent No.: US 8,001,252 B2
(45) Date of Patent: Aug. 16, 2011

(54) PSUEDOWIRE TERMINATION DIRECTLY ON A ROUTER

(75) Inventors: James N. Guichard, New Boston, NH (US); Mohammed Sayeed, Shrewsbury, MA (US); Bertrand Duvivier, Wepion (BE); Daniel C. Tappan, Boxborough, MA (US); W. Scott Wainner, Potomac Falls, VA (US); Earl Hardin Booth, Raleigh, NC (US); Christopher Metz, Danville, CA (US); W. Mark Townsley, Paris (FR); Wojciech Dec, Amsterdam (NL)

(73) Assignee: Cisco Technology, Inc., San Jose, CA (US)

( * ) Notice: Subject to any disclaimer, the term of this patent is extended or adjusted under 35 U.S.C. 154(b) by 109 days.

(21) Appl. No.: 12/415,396

(22) Filed: Mar. 31, 2009

(65) Prior Publication Data

US 2009/0185573 A1     Jul. 23, 2009

Related U.S. Application Data

(63) Continuation of application No. 10/970,014, filed on Oct. 21, 2004, now Pat. No. 7,516,224.

(51) Int. Cl.
    *G06F 15/16*     (2006.01)

(52) U.S. Cl. ......... 709/227; 709/230; 370/401; 370/466
(58) Field of Classification Search .......... 709/227–230; 370/401, 466
See application file for complete search history.

(56) References Cited

U.S. PATENT DOCUMENTS

| | | | |
|---|---|---|---|
| 6,983,288 B1 | 1/2006 | Kirkwood et al. | |
| 6,985,488 B2 | 1/2006 | Pan et al. | |
| 7,058,059 B1 | 6/2006 | Henry et al. | |
| 7,130,307 B2 | 10/2006 | Nakamura et al. | |
| 7,177,311 B1 | 2/2007 | Hussain et al. | |
| 7,480,306 B2 * | 1/2009 | Unbehagen et al. | 370/401 |
| 2004/0179555 A1 * | 9/2004 | Smith | 370/521 |
| 2005/0220022 A1 | 10/2005 | DelRegno et al. | |
| 2005/0226215 A1 * | 10/2005 | DelRegno et al. | 370/351 |
| 2005/0238049 A1 | 10/2005 | Delregno | |

* cited by examiner

*Primary Examiner* — Phuoc Nguyen
(74) *Attorney, Agent, or Firm* — BainwoodHuang (57) ABSTRACT

A method, apparatus and computer program product for routing data within a packet-switched network using a PW wherein the PW is terminated directly on the layer-3 routing device such that certain services and applications can be utilized is presented. The method, apparatus and computer program product receives an encapsulated layer-2 Protocol Data Unit (PDU) from a pseudowire emulating a service. The encapsulation is removed from the encapsulated layer-2 PDU and a layer-2 circuit associated with the pseudowire is terminated. The circuit is treated as an interface and the PDU is forwarded based on upper layer protocol information within the PDU.

20 Claims, 4 Drawing Sheets

PSUEDOWIRE TERMINATION DIRECTLY ON A ROUTER

CROSS REFERENCE TO RELATED APPLICATIONS

This Patent Application is a Continuation of U.S. patent application Ser. No. 10/970,014 filed on Oct. 21, 2004, now U.S. Pat. No. 7,516,224 entitled, "PSEUDOWIRE TERMINATION DIRECTLY ON A ROUTER", the contents and teachings of which are hereby incorporated by reference in their entirety.

BACKGROUND

In a typical networking environment used for routing data, the environment may include a number of Customer Edge (CE) routers, a number of Provider Edge (PE) routers and a packet-switched network (PSN). Data, encapsulated in layer-2 frames, may be forwarded from a first CE router to a first PE router, from the first PE router across the PSN to a second PE router, and from the second PE router to a second CE router. A Pseudowire (PW) may be utilized to transfer data across the PSN. A Pseudowire is a mechanism that emulates attributes of a service such as Asynchronous Transfer Mode (ATM), Frame Relay (FR), Point-to-Point Protocol (PPP), High Level Data Link Control (HDLC), Synchronous Optical Network (SONET) Frames or Ethernet over a PSN. The functions provided by the PW include encapsulating Protocol Data Units (PDUs) arriving at an ingress port, carrying them across a path or tunnel, managing their timing and order, and any other operations required to emulate the behavior and characteristics of the particular service. In a particular embodiment, PWs are used to carry ingress layer-2 traffic from an ingress PE router to an egress PE router, and then forward the layer-2 traffic out of an egress port of the egress PE router.

The environment further includes an attachment circuit (AC) which comprises the physical or virtual circuit attaching a CE to a PE. An AC can be a Frame Relay PVC identified by a local Data Link Connection Identifier (DLCI), an ATM PVC identified by a Virtual Path Identifier/Virtual Channel Identifier (VPI/VCI), an ATM port, an Ethernet port, a Virtual Local Area Network (VLAN), a High Level Data Link Control (HDLC) link, a PPP connection on a physical interface, a PPP session from an Layer-2 Tunnel Protocol (L2TP) tunnel, or similar such element.

Reference is made herein to layer-2 and layer-3 devices and data. These terms refer to the standard model for networking protocols and distributed applications, the International Standard Organizations Open System Interconnect (ISO/OSI) model. This model defines seven network layers; a physical layer, a data link layer, a network layer, a transport layer, a session layer, a presentation layer and an application layer.

Layer 2 is referred to as the data link layer and assigns the format of data on the network. The data link layer handles the physical and logical connections to the packet's destination using a network interface. A host connected to an Ethernet would have an Ethernet interface to handle connections to the outside world.

Layer 3 is known as the network layer. Internet Protocol (IP) version 4 or version 6 uses the network layer as a network layer interface. IP version 4 identifies each host with a 32-bit IP address. IP addresses are written as four "dot-separated" decimal numbers between 0 and 255. Some part of the IP address identifies the network and the remaining bits identify a particular host on that network.

In conventional systems, a PDU (e.g., a frame) traverses the networking environment beginning at a first CE router and ending up at a second CE router. The first CE router sends a layer-2 PDU to an ingress PE router. The ingress PE router receives the PDU and encapsulates the PDU with MPLS labels which are used to identify the individual port/circuit and the egress layer-3 PE router. MPLS labels are the key forwarding mechanisms in an MPLS network.

The encapsulated PDU is then forwarded on the PW, across the packet-switched network, to an egress layer-3 PE router. The egress layer-3 PE router removes the MPLS label that identifies the port/circuit that was added by the ingress PE router and forwards the layer-2 PDU to the second CE router.

SUMMARY

In conventional networks, Access Control Lists (ACLs) or QoS cannot be applied and data cannot be routed at layer-3. Embodiments of the invention address such requirements and provide mechanisms and techniques of routing data within a packet-switched network incorporating PWs such that applications such as Internet applications, and certain VPN applications, are run across a packet-switched network and terminated using PWs. In one particular embodiment, the method includes receiving an encapsulated layer-2 packet from a pseudowire. The layer-2 packet has been encapsulated, for example, with MPLS labels in order for the packet to be properly forwarded across the packet-switched network by way of a PW within a tunnel/LSP.

Next, the method provides for removing the layer-2 encapsulation from the encapsulated layer-2 packet. Once the encapsulated packet has traversed the packet-switched network the encapsulation is no longer required and is removed. The method includes terminating a layer-2 circuit associated with the pseudowire rather than forwarding the layer-2 PDU to an egress CE router. The circuit may be one of a T1 circuit, an E1 circuit, a T3 circuit, an E3 circuit and a Synchronous Optical NETwork/Synchronous Digital Hierarchy (SONET/SDH) circuit. The method also includes treating the incoming pseudowire (PW) as an interface at the egress PE router, and forwarding the packet based on upper layer protocol information carried within the packet.

Other embodiments include a system for routing data within a packet-switched network incorporating PWs such that certain applications can be utilized. The system includes a packet-switched network, an ingress router in communication with the packet-switched network, an egress layer-3 router in communication with the packet-switched network and a tunnel between the ingress/egress routers, the tunnel traversing the packet-switched network. A pseudowire is provided within the tunnel, wherein the pseudowire is in communication with the ingress/egress routers. The egress layer-3 router receives an encapsulated layer-2 packet from the pseudowire, removes the layer-2 encapsulation from the encapsulated layer-2 packet resulting in the original layer-2 packet, terminates a layer-2 circuit associated with the pseudowire, treats the circuit as an interface, and forwards the packet based on upper layer protocol information within the packet.

Yet other embodiments include a computer readable medium having computer readable code thereon for routing data within a packet-switched network. The medium includes instructions for receiving an encapsulated layer-2 packet from a pseudowire. The medium also includes instructions for removing layer-2 encapsulation from the encapsulated layer-2 packet, and instructions for terminating a layer-2 circuit associated with the pseudowire. The medium further includes instructions for treating the circuit as an interface, as well as instructions for forwarding the packet based on upper layer protocol information within the packet.

Still other embodiments include a computerized device, configured to process all the method operations disclosed herein as embodiments of the invention. In such embodiments, the computerized device includes a memory system, a processor, communications interface and an interconnection mechanism connecting these components. The memory system is encoded with a process for routing data within a packet-switched network as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations for routing data within a packet-switched network as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Overview

Certain services which cannot be used in conventional packet-switched networks incorporating PWs can be utilized by a networking environment incorporating pseudowires by way of the present invention. In a particular embodiment, this is accomplished by terminating the PW directly on a layer-3 routing device. Also, terminating the PW on the layer-3 routing device results in other advantages. Provider Edge (PE) routers can be used to connect customers at layer-2 and pass layer-2 traffic via a PW to a layer-3 device. Further, MPLS can be implemented such that limited layer-3 routing takes place within the access network. Additionally, distribution of policy enforcement (e.g., rate limiting) can be pushed to the layer-2 device.

Figure 1:
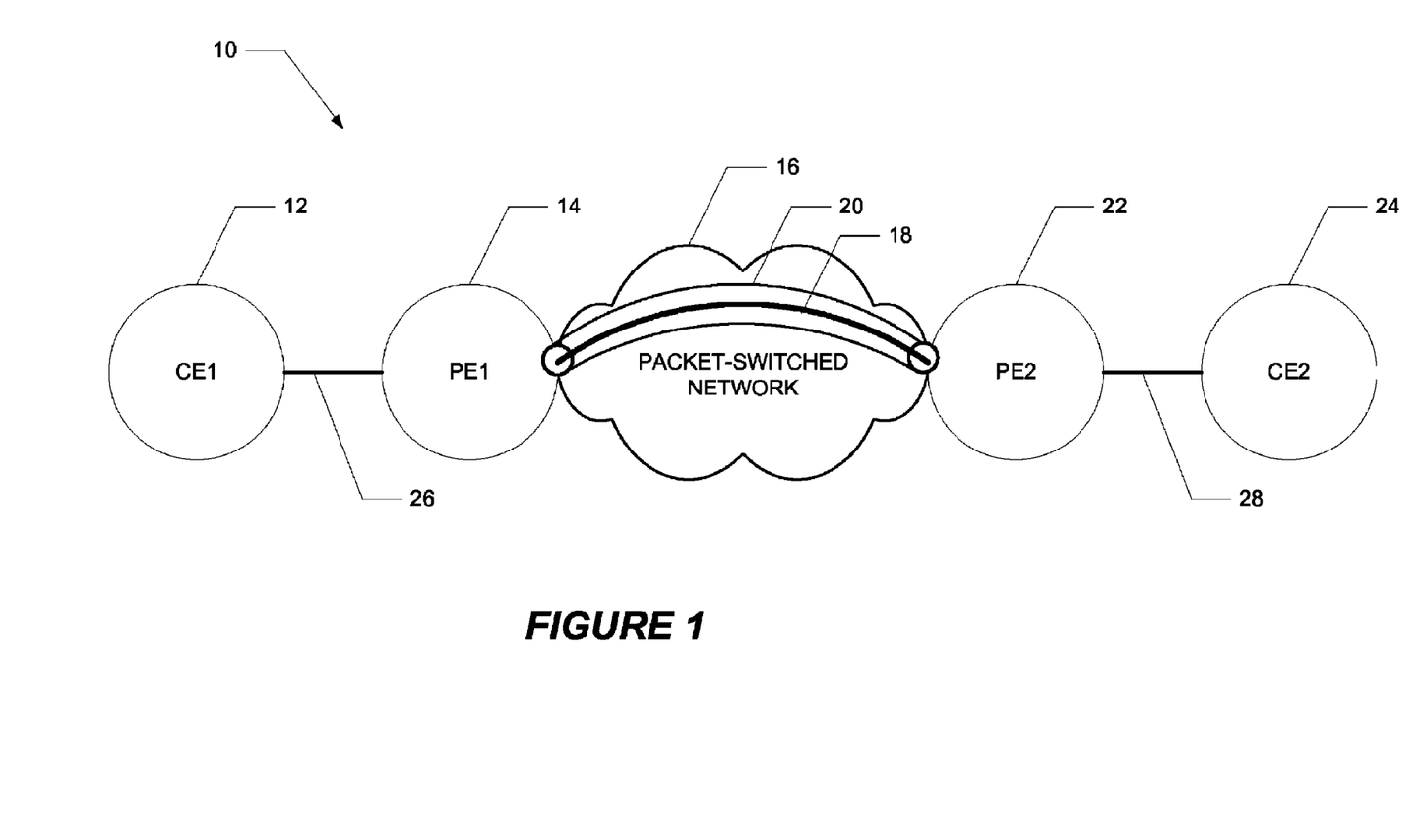
FIG. 1 is a block diagram of an environment utilizing pseudowires that performs psuedowire termination directly on a router in accordance with embodiments of the invention.

Referring now to FIG. 1, a particular embodiment of a system 10 for routing data within a packet-switched network using a PW wherein the PW is terminated directly on the layer-3 routing device such that certain services and applications can be utilized is shown. Data, in the form of frames, collectively referred to as Protocol Data Units (PDUs), are transported across the network. The system 10 includes a packet-switched network 16, an ingress router (PE1) 14 in communication with the packet-switched network 16 and an egress layer-3 router (PE2) 22 in communication with the packet-switched network 16. The packet-switched network 16 may be realized as an Internet Protocol (IP) network or an MPLS network. The router 14 and the layer-3 router 22 may be Provider Edge (PE) routers.

A tunnel 20 is established between the router 14 and the layer-3 router 22, the tunnel 20 traversing the packet-switched network 16. A PW 18 is provided within the tunnel 20. The PW 18 is in communication with the router 14 and the layer-3 router 22. In operation, the layer-3 router 22 receives an encapsulated layer-2 packet from the PW 18 and removes the encapsulation from the encapsulated layer-2 frame (resulting in an IP packet). The layer-2 frame may comprise a PPP frame, an FR frame, an ATM frame or an Ethernet frame, or any other defined layer-2 encapsulation. The layer-3 router terminates a layer-2 circuit associated with the PW 18. The termination of the layer-2 circuit may be accomplished in one of a global routing table, a Virtual Routing and Forwarding (VRF) table, or a virtual router. The layer-2 circuit termination includes providing at least one service directly to the PW 18. The layer-3 router 22 treats the circuit as an interface, and forwards the packet based on upper layer protocol information within the arriving packet.

The removal of encapsulation, termination of the layer-2 circuit, and treating of the circuit as an interface are done because certain applications (e.g., flow monitoring) can be performed only on IP packets, therefore any packets containing MPLS labels must have the labels removed in order to properly support the application. The applications supported by such an arrangement include Internet and 2547bis Virtual Private Network (VPN) Access.

The environment 10 may further include a Customer Edge (CE) router 12, in communication with router 14 by way of a first attachment circuit 26. The environment 10 may also include a second CE router 24, in communication with layer-3 router 22 by way of a second attachment circuit 28. The second CE router 24 may receive the packets forwarded by the layer-3 router, or another CE router somewhere else within the VPN environment may receive them, and this will be based on the IP destination address of any incoming packets from the PW.

A specific example of data flow through the environment follows. A frame relay frame is received at CE1 and forwarded through AC 26 to PE1. AC 26 in this example comprises a Frame Relay Data Link Connection Identifier (DLCI). A circuit is established by way of the PW 18, tunnel 20, PE1 and PE2. In order for the frame to traverse the packet-switched network 16, the frame is encapsulated with MPLS labels. This converts the layer-2 frame to an encapsulated layer-2 packet. The encapsulated frame is sent across the PW 18 within tunnel 20 where it is received by PE2. PE2 removes the encapsulation which results in the original frame being restored. PE2 terminates the circuit, and treats the circuit as an interface. The frame is then forwarded to CE2 (as the destination address of the packet is either CE2 or some device behind CE2) through AC 28, also a DLCI in this example. In such a manner, additional services and applications can be provided to the networking environment, increasing the utility of such environments.

Figure 2A:
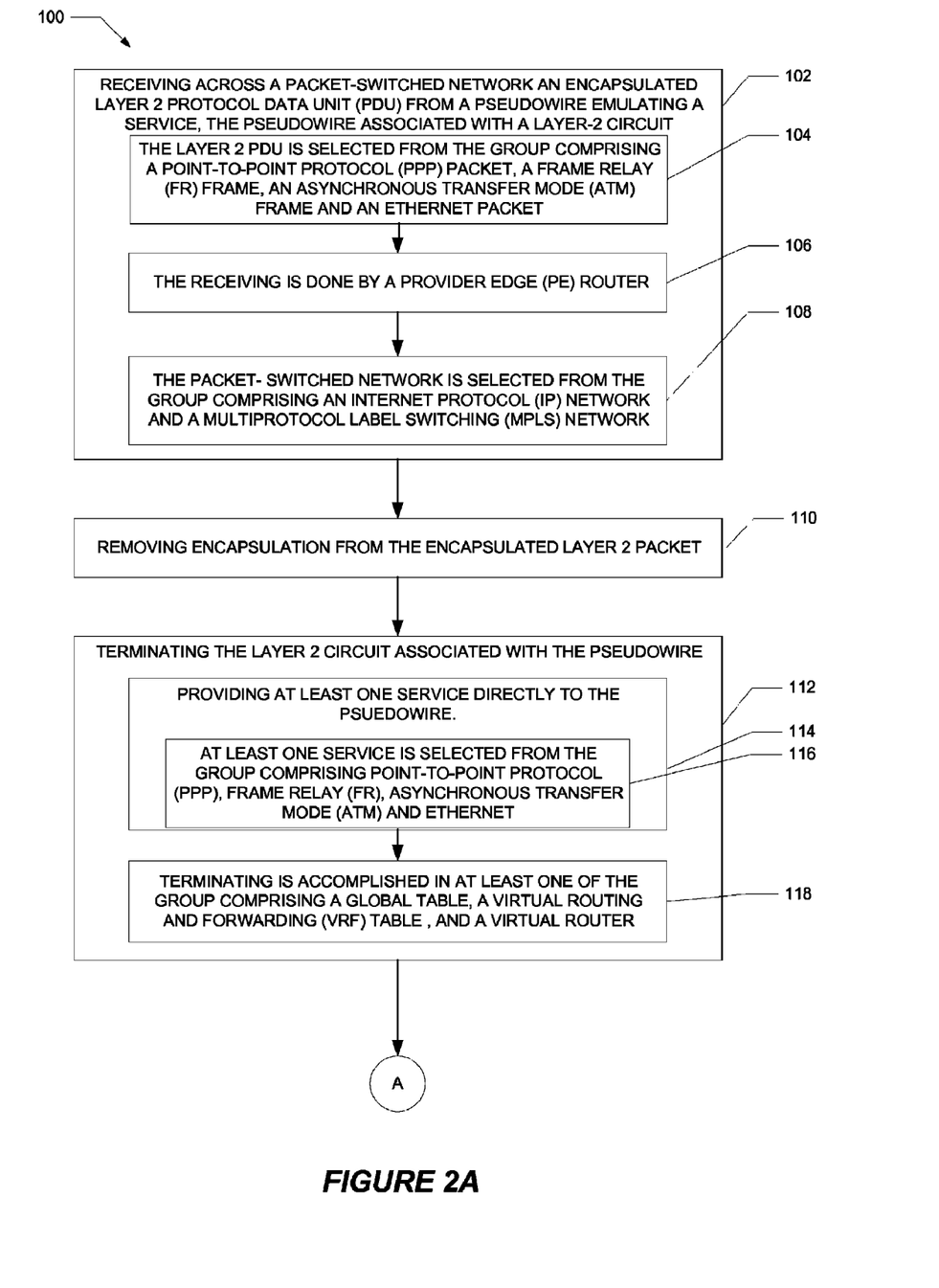
FIGS. 2A and 2B are a flow diagram of a method of performing psuedowire termination directly on a router in accordance with embodiments of the invention.
Figure 2B:
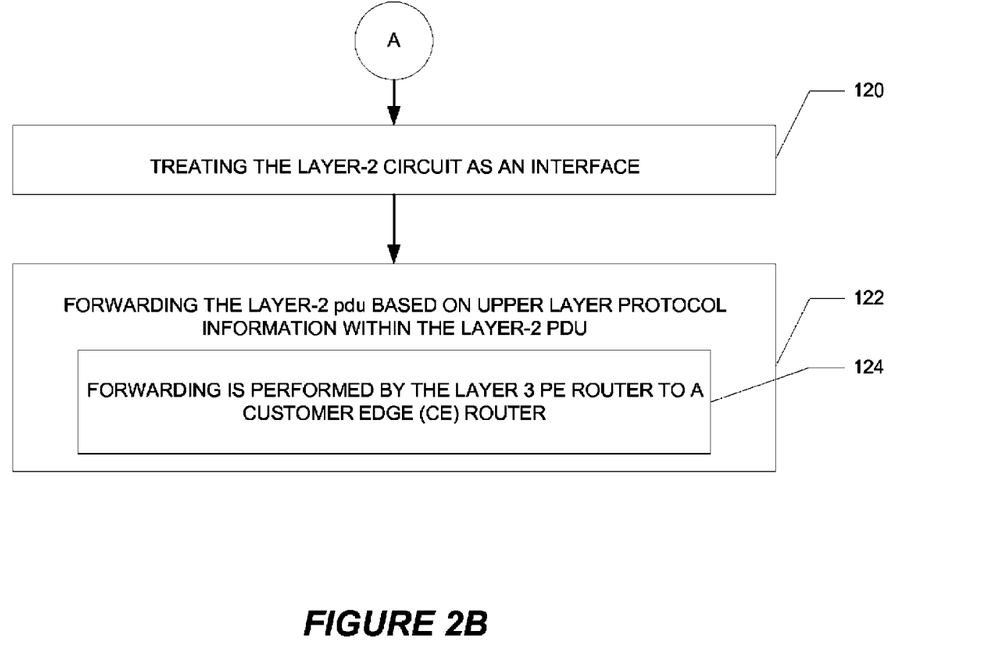

A flow chart of the presently disclosed method is depicted in FIGS. 2A and 2B. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A and 2B, a method 100 of routing data within a packet-switched network using a PW wherein the PW is terminated directly on the layer-3 routing device such that certain services and applications can be utilized is shown. The method begins with processing block 102 which discloses receiving an encapsulated layer-2 Protocol Data Unit (PDU) from a pseudowire. The pseudowire emulates a service, and is associated with a layer-2 circuit. The PDU has been encapsulated, for example by having MPLS labels attached thereto for transport across the packet-switched network by way of a tunnel having a PW running therein.

Processing block 104 recites that the layer-2 PDU is for a particular service. The service is selected from the group comprising Point-to-Point Protocol (PPP), Frame Relay (FR), Asynchronous Transfer Mode (ATM) and Ethernet.

Processing block 106 states the receiving of the encapsulated PDU is done by a Layer-3 Provider Edge (PE) router in communication with the packet-switched network by way of the PW and the tunnel.

Processing block 108 discloses that the receiving router is within a packet-switched network including at least one of the group comprising an Internet Protocol (IP) network and a Multiprotocol Label Switching (MPLS) network.

Processing block 110 recites removing the encapsulation from the encapsulated layer-2 PDU. This results in the recovery of the original layer-2 PDU.

Processing block 112 discloses terminating the layer-2 circuit associated with the pseudowire.

Processing block 114 recites that the terminating further comprises providing at least one service directly to the psuedowire. Processing block 116 states that the at least one service is selected from the group comprising PPP service, FR service, ATM service and Ethernet service.

Processing block 118 discloses that the terminating is accomplished in at least one of the group comprising a global routing table, a Virtual Routing and Forwarding (VRF) table, or a virtual router.

Processing block 120 recites treating the circuit as an interface, and processing block 122 states forwarding the PDU based on upper layer protocol information within the PDU.

Processing block 124 discloses the forwarding is performed by the Layer-3 PE router to a Customer Edge (CE) router.

Figure 3:
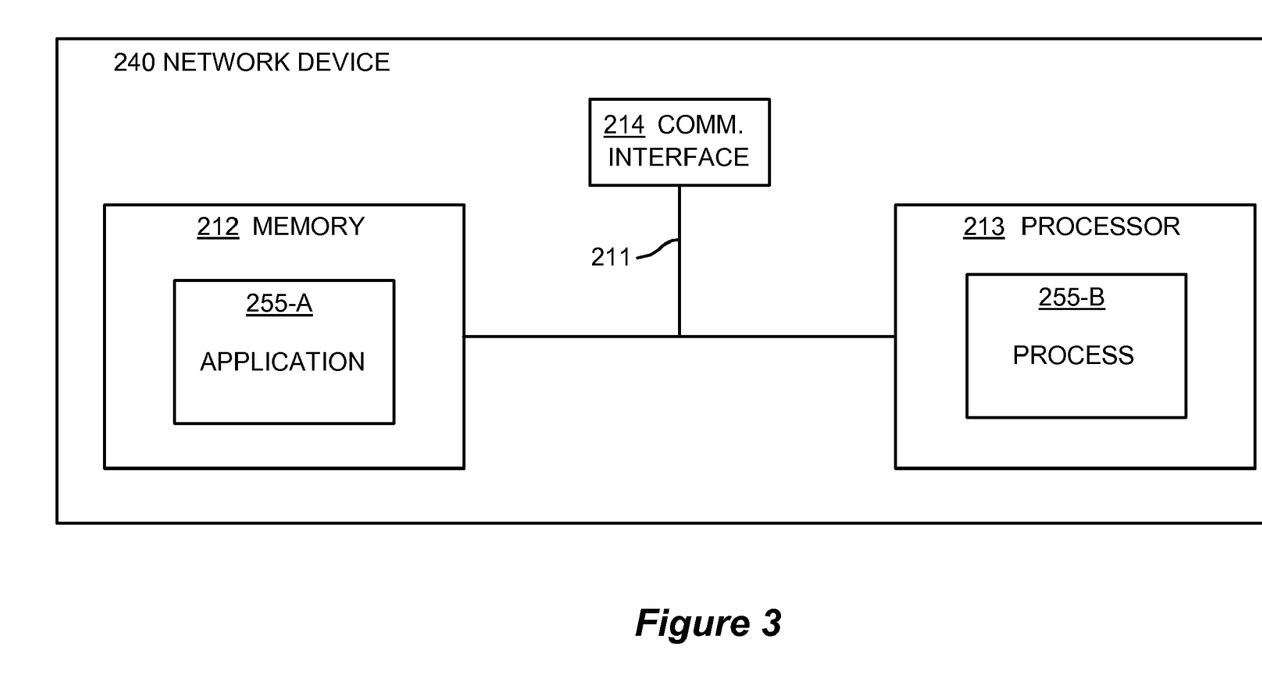
FIG. 3 illustrates an example computer system architecture that performs psuedowire termination directly on a router in accordance with embodiments of the invention.

FIG. 3 illustrates example architectures of a computer system that is configured as a network device 240. In this example, the device includes an interconnection mechanism 211 that couples a memory system 212, a processor 213, and a communications interface 214. The communications interface 214 allows the network device 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A for the network device in order to produce a corresponding process 255-B. In other words, the process 255-B represents one or more portions of the application 255-A performing within or upon the processor 213 in the network device. It is to be understood that the device operates as explained in former examples are represented in FIG. 3 by the application 255-A and/or the process 255-B.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A layer-3 apparatus, comprising:
a layer-3 apparatus controller, the layer-3 apparatus controller configured to:
receive an encapsulated layer-2 Protocol Data Unit via a pseudowire, the pseudowire configured to emulate a transport service over a network;
remove the encapsulation from the encapsulated layer-2 Protocol Data Unit to recover the layer-2 Protocol Data Unit; and
forward the layer-2 Protocol Data Unit based on protocol information carried by the Protocol Data Unit.

2. The layer-3 apparatus of claim 1, wherein the layer-3 apparatus controller is configured to terminate a layer-2 circuit associated with the pseudowire.

3. The layer-3 apparatus of claim 2, wherein the layer-2 circuit associated with the pseudowire is selected from the group consisting of a T1 circuit, an E1 circuit, a T3 circuit, an E3 circuit, and a Synchronous Optical NETWork/Synchronous Digital Hierarchy (SONET/SDH) circuit.

4. The layer-3 apparatus of claim 2, wherein, when terminating the layer-2 circuit associated with the pseudowire, the layer-3 apparatus controller is configured to provide at least one service to the pseudowire.

5. The layer-3 apparatus of claim 4, wherein the at least one service is selected from the group consisting of a Point-to-Point Protocol (PPP) service, a Frame Relay (FR) service, an Asynchronous Transfer Mode (ATM) service, and an Ethernet service.

6. The layer-3 apparatus of claim 2, wherein the layer-3 apparatus controller is configured to treat the layer-2 circuit as an interface.

7. The layer-3 apparatus of claim 1, wherein when receiving the encapsulated layer-2 Protocol Data Unit via the pseudowire, the layer-3 controller is configured to receive the encapsulated layer-2 Protocol Data Unit across a network via the pseudowire.

8. The layer-3 apparatus of claim 7, wherein when receiving the encapsulated layer-2 Protocol Data Unit across a network via the pseudowire, the layer-3 controller is configured to receive the encapsulated layer-2 Protocol Data Unit across a packet-switched network comprising at least one of an Internet Protocol (IP) network and a Multiprotocol Label Switching (MPLS) network.

9. The layer-3 apparatus of claim 1, wherein when forwarding the layer-2 Protocol Data Unit based on protocol information carried by the Protocol Data Unit, the layer-3 controller is configured to forward the Protocol Data Unit to a customer edge router based on protocol information carried by the Protocol Data Unit.

10. A method, comprising:
receiving, by a layer-3 apparatus, an encapsulated layer-2 Protocol Data Unit via a pseudowire, the pseudowire configured to emulate a transport service over a network;
removing, by the layer-3 apparatus, the encapsulation from the encapsulated layer-2 Protocol Data Unit to recover the layer-2 Protocol Data Unit; and
forwarding, by the layer-3 apparatus the layer-2 Protocol Data Unit based on protocol information carried by the Protocol Data Unit.

11. The method of claim 10, comprising terminating, by the layer-3 apparatus, a layer-2 circuit associated with the pseudowire.

12. The method of claim 11, wherein terminating, by the layer-3 apparatus, the layer-2 circuit associated with the pseudowire comprises terminating, by the layer-3 apparatus, the layer-2 circuit associated with the pseudowire, the layer-2 circuit associated with the pseudowire is selected from the group consisting of a T1 circuit, an E1 circuit, a T3 circuit, an E3 circuit, and a Synchronous Optical NETWork/Synchronous Digital Hierarchy (SONET/SDH) circuit.

13. The method of claim 11, wherein terminating, by the layer-3 apparatus, the layer-2 circuit associated with the pseudowire comprises providing, by the layer-3 apparatus, at least one service to the pseudowire.

14. The method of claim 13, wherein providing the at least one service to the pseudowire comprises providing, by the layer-3 apparatus, the at least one service to the pseudowire, the at least one service being selected from the group consisting of a Point-to-Point Protocol (PPP) service, a Frame Relay (FR) service, an Asynchronous Transfer Mode (ATM) service, and an Ethernet service.

15. The method of claim 11, comprising treating, by the layer-3 apparatus, the layer-2 circuit as an interface.

16. The method of claim 11 wherein terminating, by the layer-3 apparatus, the layer-2 circuit associated with the pseudowire comprises terminating, by the layer-3 apparatus, the layer-2 circuit associated with the pseudowire using at least one of the group consisting of a global routing table, a Virtual Routing and Forwarding (VRF) table, and a virtual router.

17. The method of claim 10, wherein receiving, by the layer-3 apparatus, the encapsulated layer-2 Protocol Data Unit via the pseudowire comprises receiving, by the layer-3 apparatus, the encapsulated layer-2 Protocol Data Unit across a network via the pseudowire.

18. The method of claim 17, wherein when receiving, by the layer-3 apparatus, the encapsulated layer-2 Protocol Data Unit across the network via the pseudowire comprises receiving the encapsulated layer-2 Protocol Data Unit across a packet-switched network, the packet-switched network comprising at least one of an Internet Protocol (IP) network and a Multiprotocol Label Switching (MPLS) network.

19. The method of claim 10, wherein forwarding, by the layer-3 apparatus, the layer-2 Protocol Data Unit based on protocol information carried by the Protocol Data Unit comprises forwarding, by the layer-3 apparatus, the Protocol Data Unit to a customer edge router based on protocol information carried by the Protocol Data Unit.

20. A computer program product having a computer-readable medium including computer program logic encoded thereon that, when performed on a layer-3 apparatus causes the layer-3 apparatus to:
    receive an encapsulated layer-2 Protocol Data Unit via a pseudowire, the pseudowire configured to emulate a transport service over a network;
    remove the encapsulation from the encapsulated layer-2 Protocol Data Unit to recover the layer-2 Protocol Data Unit; and
    forward the layer-2 Protocol Data Unit based on protocol information carried by the Protocol Data Unit.

\* \* \* \* \*

UNITED STATES PATENT AND TRADEMARK OFFICE
CERTIFICATE OF CORRECTION

| | | |
|---|---|---|
| PATENT NO. | : 8,001,252 B2 | Page 1 of 1 |
| APPLICATION NO. | : 12/415396 | |
| DATED | : August 16, 2011 | |
| INVENTOR(S) | : James N. Guichard et al. | |

It is certified that error appears in the above-identified patent and that said Letters Patent is hereby corrected as shown below:

Title Page,
Item (75) Inventor "Earl Hardin Booth, Raleigh, NC (US)" should read --Earl Hardin Booth, III, Raleigh, NC (US)--

Signed and Sealed this
Eleventh Day of October, 2011

David J. Kappos
*Director of the United States Patent and Trademark Office*